United States Patent [19]

Graham

[11] 4,370,169

[45] Jan. 25, 1983

[54] AQUEOUS DISPERSION OF GLASS FIBERS AND METHOD AND COMPOSITION FOR PRODUCING SAME

[75] Inventor: Roy R. Graham, Lexington, N.C.

[73] Assignee: PPG Industries, Inc., Pittsburgh, Pa.

[21] Appl. No.: 221,741

[22] Filed: Dec. 31, 1980

[51] Int. Cl.³ .................. C04B 43/02; D21F 11/00; C08L 91/00

[52] U.S. Cl. .................................... 106/267; 162/156

[58] Field of Search ............... 106/267; 162/156, 173, 162/190; 252/21

[56] References Cited

U.S. PATENT DOCUMENTS

| | | | |
|---|---|---|---|
| 2,702,241 | 2/1955 | Hawley et al. | 92/3 |
| 2,721,812 | 10/1955 | Iler | 117/76 |
| 2,723,971 | 11/1955 | Cupery | 260/85.7 |
| 2,789,903 | 4/1957 | Lukman et al. | 92/21 |
| 2,802,734 | 8/1957 | Bandel et al. | 92/3 |
| 2,906,660 | 9/1959 | Hungerford et al. | 162/102 |
| 2,919,221 | 12/1959 | Labino | 162/156 |
| 2,962,414 | 11/1960 | Arledter | 162/145 |
| 2,970,079 | 1/1961 | Klacsmann | 162/164 |
| 3,016,325 | 1/1962 | Pattilloch | 162/164 |
| 3,066,066 | 11/1962 | Keim et al. | 162/152 |
| 3,180,836 | 11/1965 | Jursich | 252/321 |
| 3,253,978 | 5/1966 | Bodendorf et al. | 162/152 |
| 3,410,828 | 11/1968 | Kekish | 260/67.5 |
| 3,424,608 | 1/1969 | Marzocchi et al. | 117/72 |
| 3,441,472 | 4/1969 | Foster | 162/145 |
| 3,476,589 | 11/1969 | Raphael et al. | 117/126 |
| 3,586,639 | 6/1971 | House | 252/313 |
| 3,600,272 | 8/1971 | Cortigene et al. | 162/164 |
| 3,622,528 | 11/1971 | Longoria | 260/18 |
| 3,692,885 | 9/1972 | Anello et al. | 260/950 |
| 3,749,638 | 7/1973 | Renaud et al. | 162/145 |
| 3,772,141 | 11/1973 | Chen et al. | 162/145 |
| 3,850,869 | 11/1974 | Mohr | 260/29.6 |
| 4,002,796 | 1/1977 | Baldi et al. | 428/375 |
| 4,052,256 | 10/1977 | Renaud et al. | 162/145 |
| 4,007,073 | 8/1978 | Maciaszek | 162/173 |
| 4,066,106 | 1/1978 | Graham | 139/420 C |
| 4,118,272 | 10/1978 | Ziegler et al. | 162/190 |
| 4,178,203 | 12/1979 | Chakrabarti | 162/156 |
| 4,178,204 | 12/1979 | Charkrabarti | 162/156 |
| 4,178,207 | 12/1979 | Chakrabarti | 162/156 |
| 4,179,331 | 12/1979 | Chakrabarti | 162/156 |
| 4,183,782 | 11/1978 | Bondoc | 162/156 |
| 4,208,301 | 6/1980 | Gammon | 162/173 |

FOREIGN PATENT DOCUMENTS 3475 8/1978 European Pat. Off. ............ 162/156

OTHER PUBLICATIONS

Diamond Shamrock Chemical Company, Nopco Chemical Division Product Brochure on Textile Defoamers.

*Primary Examiner*—Theodore Morris
*Attorney, Agent, or Firm*—Kenneth J. Stachel

[57] ABSTRACT

A uniform, stable low foam aqueous dispersion of glass fibers can be accomplished with the present invention. This accomplishment is obtained by the use of a unique combination of an alkyl sulfate quaternary salt of an alkyl amino fatty amine or amide and a water dispersible, liquid mineral oil, inorganic silica defoaming agent. The blend of the dispersing agent and the defoaming agent can be present on the glass fibers to be dispersed in the liquid solution or can be added to the aqueous solution prior to the addition of the glass fibers.

31 Claims, 2 Drawing Figures

AQUEOUS DISPERSION OF GLASS FIBERS AND METHOD AND COMPOSITION FOR PRODUCING SAME

The present invention is directed to a stable, low foam, uniform dispersion of glass fibers and strands in water, method of making same, sizing composition for treating the glass fibers, and the sized glass fibers and strands for use in producing glass fiber paper.

Glass fibers have been used in combination with other types of fibers or alone in the production of paper-like sheet materials. Glass fibers have been used as a supplemental fiber in specialty, synthetic, fiberwood, pulp, composite papers. It has also been recognized that small diameter glass fibers can be used to produce paper-like material that has a high strength and can be used as air or liquid filtration papers. With the growing concern of possible health hazards associated with asbestos fibers, the use of glass fibers as a replacement for asbestos fibers in producing sheet-like material is being investigated.

One problem that must be solved to enable glass fibers to replace asbestos fibers in paper-like products and others is that glass fibers are more difficult to disperse in water and they do not fibrillate in the usual paper-making sense. The dispersion problem occurs when a slush, an aqueous suspension of dispersed fibers, of the glass fibers or the combination of glass fibers and cellulose fibers is prepared as a preliminary step to the formation of a wet web. The dispersion problem of glass fibers is caused by several factors including the length of the fibers, the electrical charges on the fibers, the diameter of the fibers, differing water absorbtion characteristics of the fibers, and the presence of textile sizes or finishes on the glass fibers. When the glass fibers have small diameters, i.e., a micro fiber with a diameter up to around 6.4 microns, the glass fibers produced either without a sizing composition, or with a sizing composition that can be easily removed, or with a sizing composition containing a water-dispersible starch binder have found some utility. When the diameter of the glass fibers increases above the micro size the problem of poor water dispersibility becomes increasingly significant.

The art of trying to improve the dispersibility of glass fibers has employed the use of additional chemicals that may be anionic, cationic or nonionic depending upon the nature of the fiber. The chemicals may be supplied as a finish on the fiber or added separately to the aqueous system. For example, the art discovered that an acid pH obtained by the addition of strong mineral acids or sodium hexametaphosphate was useful in dispersing glass fibers (U.S. Pat. Nos. 3,749,638 and 2,919,221). Also the art has shown that polyacids, like phosphoric, and carboxy methyl cellulose, can be used as dispersing aids (U.S. Pat. No. 2,802,734). In addition, the art has shown that linear polysiloxanes containing at least 6 silicon atoms with each atom having 2 non-hydrolyzable oleophilic groups can be used to disperse glass fibers (U.S. Pat. No. 4,052,256). The use of these additional chemical agents either in a sizing composition for the glass fibers or as additional agents added to the aqueous system may be useful in dispersing micro size glass fibers and some may be useful in dispersing larger diameter glass fibers.

There is still a need in the art for a sizing composition for glass fibers that renders the protection needed for the glass fibers in further processing while at the same time that does not interfere with but actually assists in dispersing glass fibers in an aqueous solution. This need must be fulfilled without the creation of additional problems. There is also a need in the art for chemical agents that can be added to water to improve the dispensibility or inhibit agglomeration of glass fibers in aqueous solutions, without creating additional problems. One such problem that is created in producing aqueous dispersions of glass fibers, when additional additives are added to the water or present in the size residue on the glass, is the foaming of the resultant aqueous dispersion of glass fibers. Some agents added to the aqueous solution to assist in dispersing the glass fibers cause an intolerable amount of foaming of the aqueous dispersion. Such foaming of an aqueous dispersion containing glass fibers would make the dispersion unacceptable for use as a slush in papermaking.

It is an object of the present invention to provide a sizing composition for glass fibers that yields sized glass fibers with improved water dispersibility.

It is a further object of the present invention to provide glass fibers having a sizing composition for use in preparing a stable, low foam aqueous dispersion for use in the production of glass fiber-containing papers.

It is another further object of the present invention to provide a stable uniform, low foam, aqueous dispersion of chopped glass fibers, particularly glass fibers with larger diameters and lengths, for use as a slush in the production of glass fiber-containing papers.

It is an additional further object of the present invention to provide a method of making a stable, low foam aqueous dispersion containing chopped glass fibers having large diameters and/or long lengths, where the aqueous dispersion is useful in papermaking.

SUMMARY OF THE INVENTION

The aforementioned objects of the present invention are achieved by providing an aqueous dispersion of chopped, glass fibers having present a nitrogen-containing fatty acid derivative and a water-dispersible, liquid, mineral oil, and inorganic silica type defoaming agent. The nitrogen-containing fatty acid derivative is selected from fatty acids of alkyl amino sulfonic acids. The water dispersible, liquid defoaming agent is selected from those mineral oil, and inorganic silica type defoaming agents that are compatible with the nitrogen-containing fatty acid derivatives which act as a dispersing agent. The amount of the dispersing agent and the amount of the defoaming agent present to produce the aqueous dispersion of chopped glass fibers depends upon the manner in which the dispersant and defoaming agent are used. The dispersant and defoaming agent may be added to an aqueous solution before the addition of the glass fibers, or the dispersant and defoamer can be incorporated into an aqueous sizing composition for treating glass fibers to be added to the aqueous solution.

The treated glass fibers prepared by the application of an aqueous treating composition having at least the dispersant and defoaming agent during the formation of the glass fibers also forms an aspect of the present invention. In addition, another aspect of the present invention is the blend of the dispersant and defoaming agent that is to be added to the aqueous solution before the glass fibers to produce the low foam aqueous dispersion of glass fibers.

The present invention also embodies a method for dispersing glass fibers in an aqueous solution wherein an amount of about 50 to about 300 parts per million (PPM) of a blend of 50 to 95 weight percent of the dispersing agent and about 5 to about 50 weight percent of the defoaming agent are added to the desired amount of water. The addition is accomplished with the use of agitation. Chopped glass fiber strands either sized or unsized are added to the aqueous solution with agitation in an amount of around one half weight percent of one half inch chopped glass fiber strands or any equivalent amount of chopped glass fiber strands of different dimension. The addition of the glass fibers is accomplished with the use of agitation to produce the aqueous dispersion system of glass fiber strands for use in papermaking.

Figure 1:
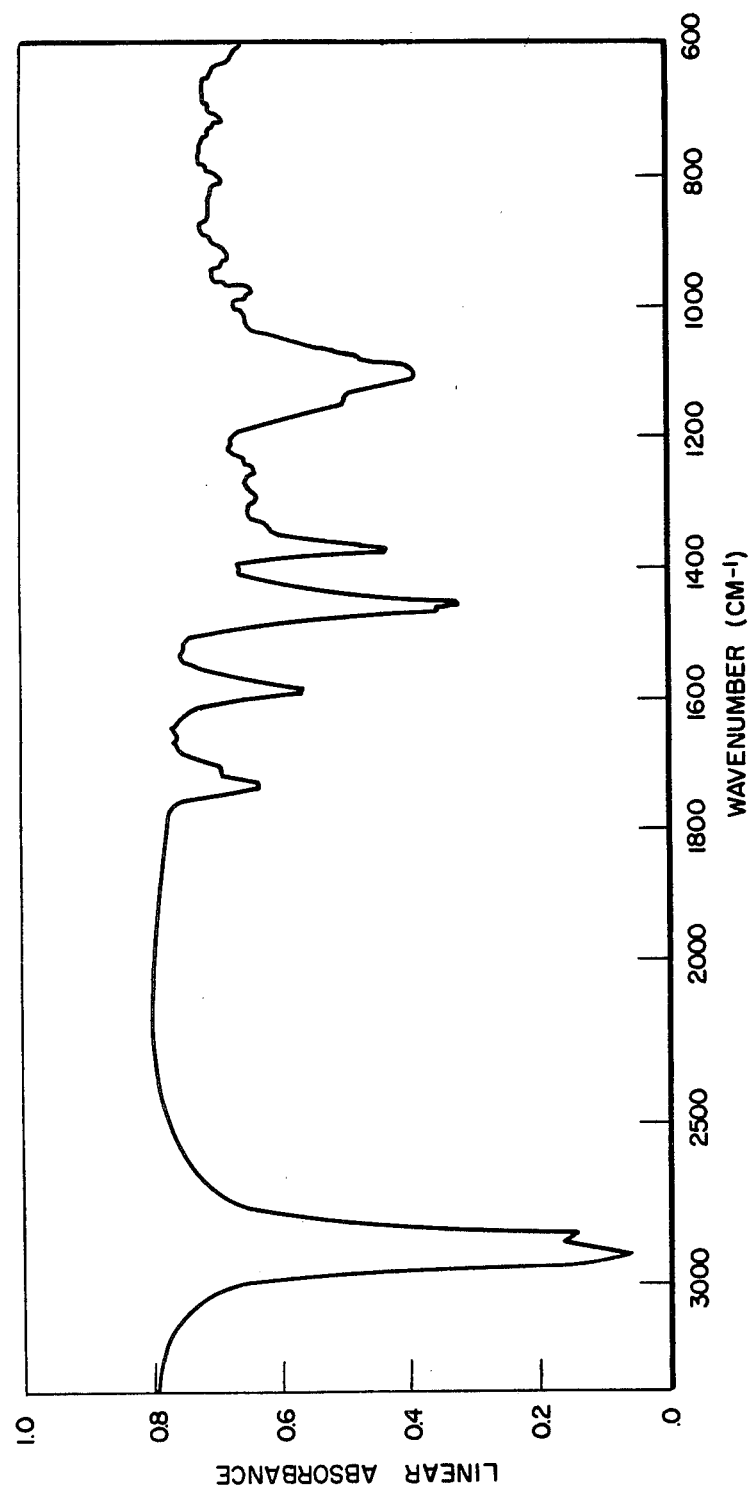
FIG. 1 shows an infrared (IR) spectrum of the blend of diethyl sulfate quaternary of an alkyl amino oleylamide dispersant and a mineral and inorganic silica preferably colloidal silica surfactant mixture used as a defoaming agent.

Both IR spectrums were produced in a Perkin-Elmer IR machine from a smear of the material on a salt plate.

DETAILED DESCRIPTION OF THE INVENTION

As previously discussed, the problem with producing aqueous solutions having glass fiber strands is mainly the difficulty in achieving a uniform distribution with the chopped glass fiber strands in the aqueous solution. As previously described, the art has used numerous approaches to overcome this problem. In trying to overcome this problem, one additional problem that has been observed is some incompatibility between the dispersing agent, defoaming agent and glass fibers. When some dispersing agents work well in dispersing glass fibers in an aqueous solution, the addition of some defoaming agent to the mixture may cause the glass fibers to percipitate or settle out. This is the case even when some of the defoaming agents are compatible with the dispersing agent.

I have found that when a particular type of dispersing agent is used in combination with a particular type of defoaming agent and used in water with the chopped glass fibers, an aqueous dispersion of glass fibers is produced where the dispersion has good uniformity of the glass fibers in the aqueous solution and low foam. This aqueous dispersion of glass fibers is achieved without the problem of excess foam and without the problem of a defoaming agent ruining the dispersion of the glass fibers in the aqueous solution.

The glass fibers useful in producing the aqueous dispersion of the present invention are any conventional glass fibers having filament diameters from the micro size to the macro size.

The glass fiber strands themselves are composed of glass fibers produced from molten streams of glass attenuated from small orifices in a bushing in a glass batch melting furnace. The glass fibers are obtained from conventional "E-Glass" and/or "621-Glass" and derivatives thereof including any more environmentally acceptable derivatives. The glass fiber strands may be produced in a wet chop or dry chop operation to produce chopped glass fiber strands having lengths particularly from around 1/32 inch to around 2 inches. Generally the glass fibers making up the dry or wet chopped glass fiber strands have filament diameters ranging from about 5 to about 27 microns. The chopped glass fiber strands can be of a filament diameter in this range or can be a mixture of filament diameters having an average filament diameter in this range. Representative of a method of fiber formation and sizing application is the process illustrated in FIG. 1 of U.S. Pat. No. 3,025,588.

Generally, such an application involves having glass fibers emerge from orifices of an electrically heated bushing of a glass batch melting furnace. These fibers are attenuated and by means of a strand pulling device these filaments are gathered to form a strand of glass fibers which may comprise numerous individual fibers. The sizing is applied to the fibers by a conventional size applicator, such as a kiss applicator or a belt applicator device (although spray type applicators could be used). Detail of a sizing applicator is shown in U.S. Pat. No. 2,728,972. The filaments after exiting the bushing are cooled by air or preferably water. The filaments are gathered into bundles by a gathering shoe and are then led to a strand pulling device such as illustrated in U.S. Pat. No. 3,292,013. The glass fiber strand or strands, if the filaments exiting from the bushing have been separated into several strands, are then wound onto a forming tube on a collet rotating at approximately 7,500 rpm to produce a strand travel of approximately 12,000 to 15,000 feet per minute. The glass fiber strand forming packages are then dried and the strands from the package may be dry chopped separately or together or in the form of roving.

The wet chop operation for producing chopped glass fibers having an aqueous sizing or treating composition can be performed by any conventional wet chop process known in the art. For example the processes of U.S. Pat. Nos. 3,869,263; 3,996,032; 4,043,779; 4,045,196; and 4,158,555; can be used.

When the glass fiber strands are composed of filaments having a diameter larger than around 13 microns, the blend of the dispersing agent and defoaming agent that is used in the aqueous sizing composition need not be accompanied by any other components other than water. When the glass fiber strands are composed of filaments having a diameter smaller than around 13 microns, the dispersing agent and defoaming agent present in a sizing composition should also be accompanied by a film former and/or lubricant and water. An additional ingredient that might also be present in any sizing composition having the dispersing agent and the defoaming agent blend is a silane coupling agent. Any of the conventional film formers, lubricants, and silane coupling agents can be used in the sizing composition in conventional amounts.

The dispersing agent that can be used in a sizing composition for treating the glass fibers or can be used by the addition to an aqueous solution before the addition of the glass fibers to the aqueous solution is of the type known as dialkyl sulfate quaternary of an alkyl amino fatty amine or amide. This nitrogen-containing fatty acid derivative can be a mixture of compounds from this chemical type. The fatty acid amine or fatty acid amide used to produce the quaternary ammonium salt generally contains at least 8 carbon atoms and preferably at least 14 carbon atoms. Nonexclusive examples of the fatty acid amine or fatty acid amide include: odecyl, n-tetradecyl, n-hexadecyl, lauryl, myristyl, palmityl, oleyl, coconut oil, tallow oil, hydrogenated tallow oil, cotton seed oil, dilaurayl oil, dimyristyl, dipalmityl, distearyl, dicoconut oil, dihydrogenated tallow oil, and soya oil. In the dialkyl portion of the quaternary ammonium salt examples of unsubstituted hydrocarbon radicals that can be used within that grouping include methyl, ethyl, propyl, butyl, pentyl, hexyl, heptyl, octyl, and nonyl. A particularly useful quaternary ammonium salt is the diethyl sulfate quaternary of an alkyl amino oleylamide available from Diamond Shamrock Company under the trade designation "Nopco, 2173 B" material. These nitrogen-containing fatty acid derivatives can be produced by any conventional process known to those skilled in the art, such as, reaction of the fatty acid to produce the fatty acid derivative, the amine, or amide, and the reaction of this compound with dimethyl sulfate to produce the quaternary ammonium ethyl sulfate or the reaction of the fatty acid amine or amide with the sulfur-containing compound like N-methyl taurine. It is also within the scope of the present invention to use this type of dispersing agent in combination with other types of dispersing agents such as the trialkylaryl ammonium halides, wherein the predominant amount of the dispersing agent is the nitrogen-containing fatty acid derivative and the minor amount is the halide dispersing agent.

Figure 2:
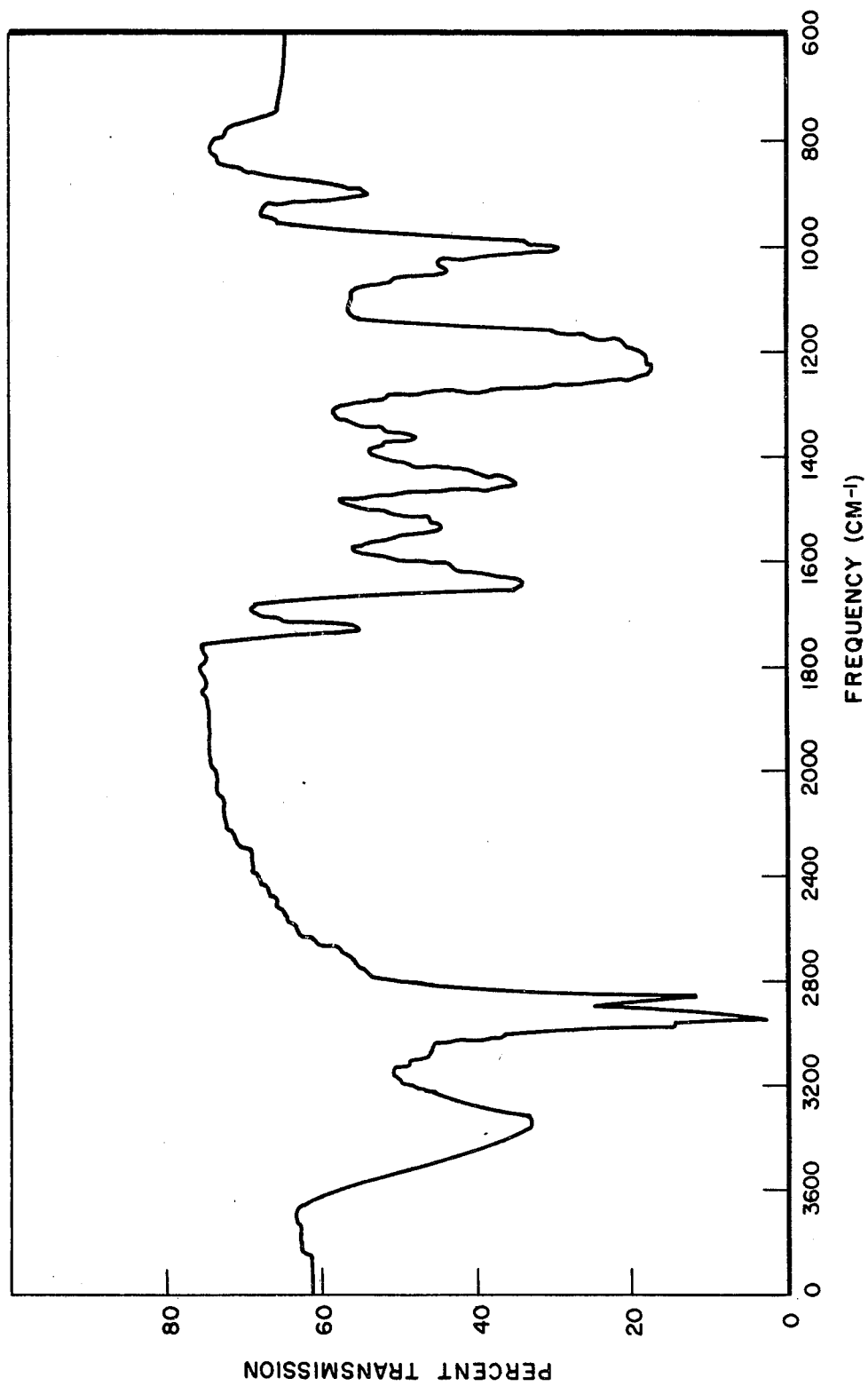
FIG. 2 shows an IR spectrum of the mineral oil and inorganic, preferably colloid silica-surfactant defoaming agent mixture.

The defoaming agent useful in the present invention is a water dispersible, liquid, mineral oil, inorganic silica type defoaming agent, where the mineral oil is the predominant component. Preferably the mineral oil inorganic silica defoaming agent has colloidal silica and has a low silicone content of around less than 0.5 percent. In the defoaming agent mixture of mineral oil and colloidal silica, any surfactant such as cationic, anionic, nonionic or amphoteric can be used to make the mixture water dispersible. Preferably a nonionic surfactant is used. Particularly useful defoaming agents are the defoamers availabe from Diamond Shamrock Chemical Company, Nopco Chemical Division, under the trade designations "319R" and "319M". The 319R defoamer has an IR spectrum of FIG. 2 and an amber liquid appearance, silicon content of less than 0.2 percent, 100 percent activity, 7.1 pH for 2% solution at 25° C., and is damaged upon freezing. The "319M" defoamer has an amber liquid appearance, silicone content of less than 0.5 percent, 100 percent activity, 6.6 pH of 2% solution at 25° C., and is damaged on freezing.

The dispersing agent and defoaming agent are used in a blend where the amounts of the dispersing agent in the blend are in the range of about 50 to about 95, preferably about 75 to about 95, weight percent of the blend and the amount of the defoaming agent is in the range of about 5 to about 50, preferably about 5 to about 25, weight percent of the blend. The blend of the Nopco 2173B nitrogen-containing fatty acid derivative and the Nopco 319R defoaming agent has an IR spectrum as shown in FIG. 1. This blend can be used in a sizing composition to treat the glass fibers, wherein the other components in the sizing composition depend upon the particular filament diameter of the glass fibers making up the glass fiber strand. When the blend is used in a sizing composition the amount of the blend used is in the range of about 0.1 to about 50, preferably 0.5 to 20, weight percent of the aqueous composition. In the case of larger diameter fibers, the blend is the only component present in addition to water, but a silane coupling agent may also be incorporated into the aqueous sizing composition in conventional amounts. When the filaments are of a smaller diameter the blend is accompanied in the sizing composition with a film former and/or lubricant and/or silane coupling agent. When chopped, treated glass fiber strands are produced by the wet chop process and the filament diameter of the fibers is over around 13 microns, the aqueous treating composition has the blend, a conventional film former like any conventional starch including cationic starches, lubricant, cationic lubricant, and optionally a silane coupling agent. When chopped, treated glass fiber strands are produced by a dry chop process the aqueous treating composition has the blend, a film former, nonionic lubricant, silane coupling agent, and around half as much cationic lubricant as used in the wet chop process. The amounts of the components other than the blend in the composition are conventional amounts known in the art. With all the components in the aqueous treating composition the total solids of the composition is about 5 to about 50 weight percent.

The blend may also be used as an additive to the aqueous solution before the glass fibers are added to the aqueous solution to form the dispersion. In this instance the amount of the blend used is in the range of of about 50 to about 300 pars per million (PPM) of the aqueous solution, although greater amounts may be used but diminishing returns are obtained as far as further improvement in the dispersion. A particularly useful blend has the IR spectrum of FIG. 1 and has 98.31 percent solids, pH of 6.3 for 10% solids solution, and a viscosity of 13800.0 cps #6 spin at 50 RPM.

In addition to the blend in the aqueous sizing composition or as an additive to the aqueous solution, a viscosity building agent may be used. Non-exclusive examples of viscosity building agents include carboxy methyl cellulose and soluble salts thereof, carboxy methyl hydroxy ethyl cellulose and soluble salts thereof and hydroxy ethyl cellulose and mixtures thereof. Particularly useful viscosity building agents are available from Hercules, Inc. under the trade designation Natrasol 250 LR and HR substituted and unsubstituted hydroxy ethyl cellulose.

When the blend of the dispersing agent and defoaming agent are used in an aqueous sizing composition, the sizing composition with or without additional components is prepared by conventional methods known to those skilled in the art. The sizing composition is applied to the glass fibers, while they are being formed by conventional methods known to those with skill in the art to produce sized wet chop or sized dry chop glass fiber strands. These sized glass fiber strands are then available to be added to an aqueous solution in amounts in the range of about 0.1 to about 1 weight percent of the aqueous solution for use as in aqueous glass fiber containing dispersions for paper making.

In the process of the present invention, the desired part per million amount of the blend of the dispersing agent and defoaming agent is added to the aqueous solution with agitation, and the desired amount, between about 0.1 to about 1 weight percent of the aqueous solution, of around ½ inch chopped glass fiber strands, either sized or unsized is added to the aqueous solution.

Generally the length of the chopped glass fiber strands vary from about 1/32 of an inch to about 2 inches and more particularly the average length varies from about ⅛ of an inch to about 2 inches. When the average length of the glass fiber strands is less than ½ of an inch, the amount of glass fibers added to the aqueous solution is preferably in the upper portion of the range and higher. When the average length of glass fiber strand is more than ½ of an inch, the amount used is preferably in the lower portion of the range and lower as the average length approaches 2 inches. Whenever the chopped glass fiber strands are added to the aqueous solution it is with the use of agitation. After the chopped glass fiber strands have been added to the aqueous solution containing the blend the aqueous solution is agitated for a period of time to produce the dispersion containing glass fibers for use in paper making.

PREFERRED EMBODIMENT

It is the preferred embodiment of the present invention to use the dispersing agent which is a diethyl sulfate quaternary of an alkyl amino oleylamide in a blend with the low-silicon, water dispersible, mineral oil-colloidal silica, liquid defoaming agent available as Nopco 319R. The blend is preferably added to the aqueous solution to which the chopped glass fiber strands are to be added. In the blend, it is preferred to have an amount of around 90 weight percent of the blend of the dispersing agent and around 10 weight percent of the blend of the defoaming agent. In the preferred process of adding the blend to the aqueous solution, the amount of blend added is preferably about 50 to about 70 ppm of the aqueous solution to which the glass fibers are to be added. The aqueous solution with the blend is agitated and chopped glass fiber strands having average filament diameters around 5 to about 17 microns in around half-inch lengths are added to the agitating aqueous solution. It is preferred that the chopped glass fiber strands do not contain a sizing composition if the filament diameter is around 13 microns. The amount of glass fiber strands added to the aqueous solution is preferably around 0.5 weight percent of the aqueous solution. The glass fiber strands are added to the aqueous solution with agitation to produce an aqueous dispersion of glass fibers that can be used in paper making.

The invention is further elucidated in a-non-limiting fashion by the following examples.

EXAMPLE I

There was added to 1514 kg of water 200 milliliters of a blend of diethyl sulfate quaternary of an alkyl amino oleylamide Nopco 2173B and 10 percent of the defoaming agent Nopco 319R. In addition, there was added 360 grams of the viscosity building agent Natrasol HR (hydroxy ethyl cellulose). With agitation, there was added 20 pounds (9.1 kg) of ⅛ inch chopped glass fiber strands composed of filiments having a diameter of around 15 to 16 microns. The aqueous solution containing the glass fiber strands was agitated and produced a good dispersion with low foam.

EXAMPLE II

A glass fiber-containing aqueous dispersion with low foam was produced by adding 363 grams of the viscosity building agent hydroxy ethyl cellulose and 120 milliliters of a blend of the dispersing agent and defoaming agent. The dispersing agent was the diethyl sulfate quaternary of an alkyl amino oleylamide which was present in 90 weight percent of the blend. The antifoaming agent was the water dispersible low silicone mineral oil, colloidal silica defoaming agent known as Nopco 319R which was present in the blend in an amount of 10 weight percent of the blend. With agitation there was added 0.5 weight percent of ⅛ inch chopped glass fiber strands, where the fibers in the strands had a filament diameter of around 6 microns. The strands also contained a starch-lubricant composition. Any conventional starch can be used in the composition, even the cationic starches. After agitation for a period of time, the aqueous dispersion of glass fibers was uniform and had low foam content.

EXAMPLE III

A similar aqueous dispersion having glass fiber strands was prepared as in Example II, except that the filament diameter of the fibers in the chopped glass fiber strands was around 9.5 microns and the length of the chopped glass fiber was around ½ inch. This produced a fairly good dispersion formation with low foam.

EXAMPLE IV

An aqueous dispersion of chopped glass fibers was prepared using 25 pounds (11.3 kg) of water. To this amount of water there was added 1 gram of a blend of diethyl sulfate quaternary of an alkyl amino oleylamide, Nopco 2173B material and the water dispersible, low silicon, mineral oil, colloidal silica defoaming agent 319R. In the blend, there was 75 weight percent of the diethyl sulfate quaternary of an amino oleylamide and 25 weight percent of the defoamer. With agitation, there was added to the aqueous solution containing the blend 30 grams of ½ inch chopped glass fiber strands, where the fibers had a filament diameter of around 15 to 16 microns. The dispersion was fair, with medium formation on the agitation and medium roping.

EXAMPLE V

Another aqueous dispersion of chopped glass fiber strands was prepared in the same manner as Example IV except for the amounts of the dialkyl sulfate quaternary of an alkyl amino fatty acid amide and defoamer present in the blend. In this example 60 weight percent of the 1 gram was the quaternary of the fatty acid and 40 weight was the defoamer. The dispersion produced was fair with medium formation of glass fibers on the impeller of the agitator and medium roping (stringy agglomeration) and no clumping.

EXAMPLE VI

An aqueous dispersion of chopped glass fiber strands was prepared as in Example V except a different blend was added to the water before the addition of the chopped glass fiber strands. The blend was composed of:

10 drops of ammonium hydroxide but any suitable base can be used
2.7 grams of Naturasol 250 HR hydroxy methyl cellulose thickening agent.

These components were stirred with the water until they were dissolved: then there was added:

1.5 ml of the blend of Example V.

The dispersion produced was good with only light roping and clumping at the pH of 8.65 for the water and modified blend.

ILLUSTRATIVE EXAMPLE I

An aqueous dispersion of glass fibers was prepared in the same manner as Example V except instead of adding the blend to the water only the diethyl sulfate quaternary of an alkyl amino fatty acid amide was added. The amount of the amide added was 1 gram. The aqueous dispersion produced was very good but had too much foam to be used properly in papermaking.

ILLUSTRATIVE EXAMPLE II

An aqueous dispersion of glass fibers was prepared with 25 pounds (11.3 kg) of water. 1 gram of a cationic material and defoamer, and 30 grams of chopped glass fiber strands having a starch-polymer-oil size and a filament diameter of the fibers in the strands of 15 to 16 microns and a ½ inch average filament length. The nitrogen-containing cationic material was a blend of alkyl dimethyl benzyl ammonium chlorides. The defoamer was a clear yellow liquid that was silicone-free with 100 percent activity that formed a stable white emulsion in water at 25° C. at 10 percent solution, that has a pH of 6.5 for a 2 percent solution at 25° C. and is available from Diamond Shamrock Chemical Company under the trade designation 419A.

The aqueous dispersion of glass fibers was a good dispersion without formation on the impeller of the agitator, but the dispersion had a greal deal of foam. The defoamer had no effect on the foam or the dispersion.

The foregoing has described a blend of a dispersing agent selected from alkyl sulfate quaternary of an alkyl amino fatty acide amine or amide derivative and a water dispersible, liquid mineral oil, inorganic silica defoaming agent. The blend is useful in producing aqueous dispersions having glass fibers that are uniform and have a low foam content. The blend can be used as an additive to an aqueous solution before the addition of the chopped glass fiber strands or as a component of a sizing composition for treating glass fiber strands. The foregoing has also described the process of adding the blend to the aqueous solution and then adding the chopped glass fiber strands to produce the uniform low foam aqueous dispersion of glass fibers.

I claim:

1. An aqueous sizing composition for glass fibers having filament diameters larger than around 13 microns to render glass fibers more readily dispersible in aqueous solutions, comprising:
   a. about 0.1 to about 50 weight percent of a blend of alkyl sulfate quaternary of an alkyl amino fatty acid amine or amide and a liquid mineral oil-inorganic silica defoaming agent made water dispersible with a compatible surfactant where the amount of the quaternary material is in the range of about 50 to about 95 weight percent of the blend and the amount of the defoaming agent is around 5 to about 50 weight percent of the blend; and
   b. water.

2. Aqueous sizing composition of claim 1 for glass fibers having filament diameters less than 13 microns to produce chopped glass fibers that are more readily dispersible in aqueous solution, that includes a film former.

3. Aqueous sizing composition of claim 1 or 2 wherein there is present a lubricant.

4. Aqueous sizing composition of claim 1 or 2 wherein there is present a silane coupling agent.

5. Aqueous sizing composition of claim 1 or 2 wherein there is present a cationic lubricant.

6. Aqueous sizing composition of claim 1 or 2 having present a thickening or viscosity building agent.

7. Glass fibers having present the aqueous sizing composition of claims 1 or 2.

8. Glass fibers having present the dried residue of the aqueous sizing composition of claims 1 or 2.

9. An aqueous sizing composition of claim 1 or 2, wherein the blend of quaternary material and defoaming agent has about 5 to about 95 weight percent of the blend as the quaternary material an about 5 to about 25 weight percent of the blend as the defoaming agent.

10. An aqueous sizing composition of claim 1 or 2 wherein the dispersing agent is diethyl sulfate quaternary of an alkyl amino oleylamide.

11. Aqueous sizing composition of claim 1 wherein the defoaming agent is one exhibiting the infrared spectrum of FIG. 2.

12. Aqueous sizing composition of claim 1 wherein the blend of the quaternary material and defoaming agent is one exhibiting the infrared spectrum of FIG. 1.

13. A process of producing a more uniform dispersion, low foam, aqueous dispersion of glass fibers, comprising:
   a. blending an alkyl sulfate quaternary of an alkyl amino fatty acid amine or amide with a, liquid, mineral oil, inorganic silica defoaming agent made water dispersible with a compatible surfactant in amounts of dispersing agent in the range of about 50 to 95 weight percent of the blend and defoaming agent in the range of 5 to about 50 weight percent of the blend;
   b. adding to an aqueous solution with agitation an amount of the blend in the range of about 50 to about 300 ppm and
   c. adding to the agitated aqueous solution an amount of glass fibers in the range of about 0.1 to 1 weight percent of the aqueous solution wherein the glass fibers are chopped glass fiber strands having lengths from about 1/32 to an inch to 2 inches.

14. Aqueous dispersion of glass fibers having a uniform dispersion and low foam content, comprising:
   a. about 50 to about 300 ppm of a blend of alkyl sulfate quaternary of an alkyl amino fatty acid amine or amide derivative in an amount of about 50 to about 95 weight of the blend, and a liquid mineral oil, inorganic silica defoaming agent made water dispersible with compatible surfactant in an amount of about 5 to about 50 weight percent of the blend,
   b. chopped glass fiber strands having a length in the range of about 1/32 second to about 2 inches, and
   c. water.

15. Process of claim 13 or aqueous dispersion of claim 14 wherein the blend includes a thickening or viscosity building agent.

16. Process of claim 13 or aqueous dispersion of claim 14 wherein the chopped glass fiber strands have filament diameters in the range of about 5 to about 27 microns.

17. Process of claim 13 or aqueous dispersion of claim 14 wherein the chopped glass fiber strands have a filament diameter greater than 13 microns and where the glass fibers have a starch-lubricant sizing composition.

18. A composition of dispersing and defoaming agents for producing improved aqueous dispersions of glass fibers exhibiting the infrared spectrum of FIG. 2.

19. A composition of dispersing and defoaming agent for producing improved aqueous dispersions of glass fibers, comprising:
   about 50 to about 95 weight percent of a alkyl sulfate quaternary of an alkyl amino fatty acid or amide, and about 5 to about 50 weight percent of a mineral oil, inorganic silica, surfactant defoaming agent having the infrared spectrum of FIG. 2.

20. Composition of claim 19 or dispersion of claim 14 wherein the alkyl sulfate quaternary of an alkyl amino fatty acid or amide is diethyl sulfate quaternary of an alkyl amino oleylamide present in an amount of about 75 to about 95 weight percent of the composition when the defoaming agent is present in an amount in the range of about 5 to about 25 weight percent of the blend.

21. Composition of claim 19 including a thickening or viscosity building agent.

22. Aqueous dispersion of the glass fibers of claims 7 or 8.

23. Composition of claim 19 or dispersion of claim 14 wherein the dispersing agent is diethyl sulfate quaternary of an alkyl amino oleylamide.

24. Aqueous sizing composition of claim 6 wherein the thickening or viscosity building agent is selected from the group consisting of carboxyl methyl cellulose and soluble salts thereof, carboxy methyl hydroxy ethyl cellulose, and soluble salts thereof, and hydroxy ethyl cellulose and substituted and unsubstituted hydroxy ethyl cellulose and mixtures thereof.

25. Aqueous sizing composition of claim 2, wherein the film former is a starch.

26. Aqueous sizing composition of claims 1 or 2, wherein the defoaming agent comprised of the liquid mineral oil-inorganic silica made water dispersible with a nonionic surfactant has a colloidal silica and has an amount of silicone of less than around 0.5 percent.

27. Aqueous sizing composition for glass fibers having filament diameters less than around 13 microns to render glass fibers more readily dispersible in aqueous solutions, comprising:
   a. about 0.1 to about 50 weight percent of a blend of alkyl sulfate quaternary of an alkyl amino fatty acid amine or amide and a liquid mineral oil-inorganic silica defoaming agent made water dispersible with a compatible surfactant where the amount of the quaternary material is in the range of about 50 to about 95 weight percent of the blend and the amount of defoaming agent is around 5 to about 50 weight percent of the blend; and
   b. a starch film former,
   c. lubricant, and
   d. water.

28. Process of claim 13 or aqueous dispersion of claim 15 wherein the thickening or viscosity building agent in the blend is selected from the group consisting of carboxy methyl cellulose and soluble salts thereof, carboxy methyl hydroxy ethyl cellulose and soluble salts thereof, and hydroxy ethyl cellulose, and substituted and unsubstituted hydroxy ethyl cellulose and mixtures thereof.

29. Composition of claim 21 wherein the thickening or viscosity building agent is selected from the group consisting of carboxy methyl cellulose and soluble salts thereof, carboxy methyl hydroxy ethyl cellulose and soluble salts thereof, and hydroxy ethyl cellulose, and substituted and unsubstituted hydroxy ethyl cellulose and mixtures thereof.

30. Composition of claims 1 or 2, wherein the compatible surfactant is a nonionic surfactant.

31. Process of claim 13 or aqueous dispersion of claim 14, wherein the compatible surfactant is a nonionic surfactant.

* * * * *

UNITED STATES PATENT AND TRADEMARK OFFICE
CERTIFICATE OF CORRECTION

PATENT NO. : 4,370,169
DATED : January 25, 1983
INVENTOR(S) : Roy R. Graham

It is certified that error appears in the above-identified patent and that said Letters Patent are hereby corrected as shown below:

Claim 9, line 3, of the application, "an" should read as

--and-- at column 10, line 3 of the patent.

Claim 14, subparagraph c., last line of the claim in the application, "second" after the term '1/32' should be deleted in the patent at column 10, Claim 14, subparagraph b., line 46.

Signed and Sealed this

Twelfth Day of April 1983

[SEAL]

Attest:

Attesting Officer

GERALD J. MOSSINGHOFF

Commissioner of Patents and Trademarks